United States Patent [19]

Thompson et al.

[11] 4,071,150
[45] Jan. 31, 1978

[54] CONDUCTOR SUPPLY SYSTEM FOR COMMUNICATION CABLE MAKING APPARATUS

[75] Inventors: Walter F. Thompson; Dennis M. Redo, both of Somerville, N.J.

[73] Assignee: General Cable Corporation, Greenwich, Conn.

[21] Appl. No.: 626,219

[22] Filed: Oct. 28, 1975

[51] Int. Cl.² ............................................. B65G 11/08
[52] U.S. Cl. .................................... 214/16.4 R; 57/53
[58] Field of Search .................... 214/16.4 R, 16.4 C; 242/35.5 R, 35.5 A; 29/755; 57/52, 53

[56] References Cited

U.S. PATENT DOCUMENTS

| 746,247 | 12/1903 | Baggaley | 214/16.4 C |
|---|---|---|---|
| 2,020,552 | 11/1935 | Hills | 214/16.4 R |
| 2,307,925 | 1/1943 | Gray | 242/35.5 R |
| 2,755,950 | 7/1956 | Forshey | 214/16.4 C |
| 2,788,179 | 4/1957 | Hafer et al. | 242/35.5 R |
| 3,753,507 | 8/1973 | James et al. | 214/16.4 R |
| 3,817,406 | 6/1974 | Sawada et al. | 214/16.4 C |
| 3,895,724 | 7/1975 | Thompson et al. | 214/16.4 R |

*Primary Examiner*—Lawrence J. Oresky
*Assistant Examiner*—Carl Rowold
*Attorney, Agent, or Firm*—Roy C. Hopgood; John M. Calimafde; Charles W. Neill

[57] ABSTRACT

This invention receives paired bobbins from a pairing machine, stores the various bobbins of a given color coding in separate compartments of a rack, and selectively discharges bobbins to an elevator in accordance with the demand from a cabling machine. The elevator extends for the length of the rack and receives the desired bobbins with the color coded pairs called for by remote control from the cabling machine. The compartments of the storage racks slope in a direction that cause bobbins to roll from the rack by gravity on to the elevator; and the elevator slopes to discharge bobbins by gravity to a floor conveyor that carries them to the cabling machine.

17 Claims, 6 Drawing Figures

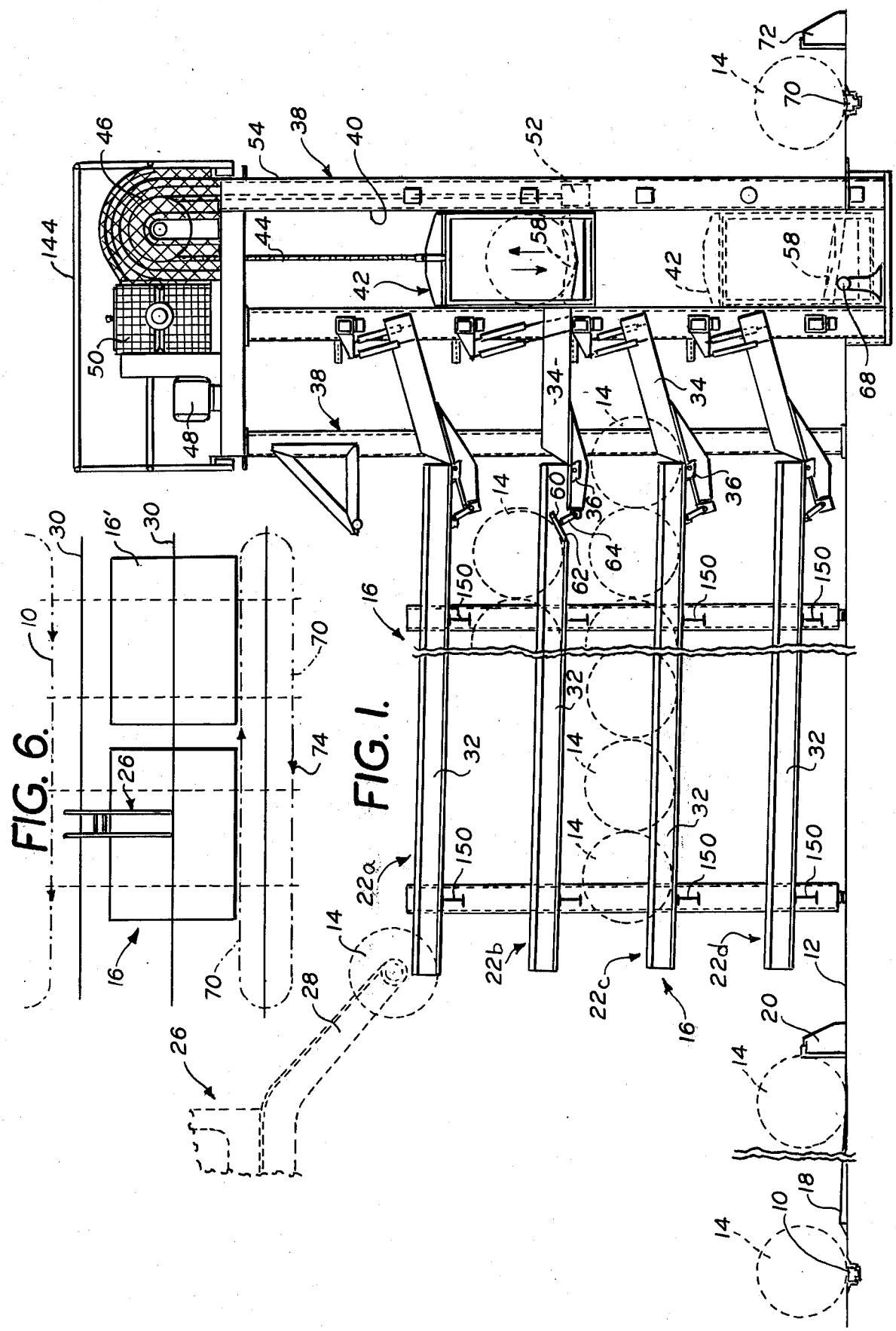

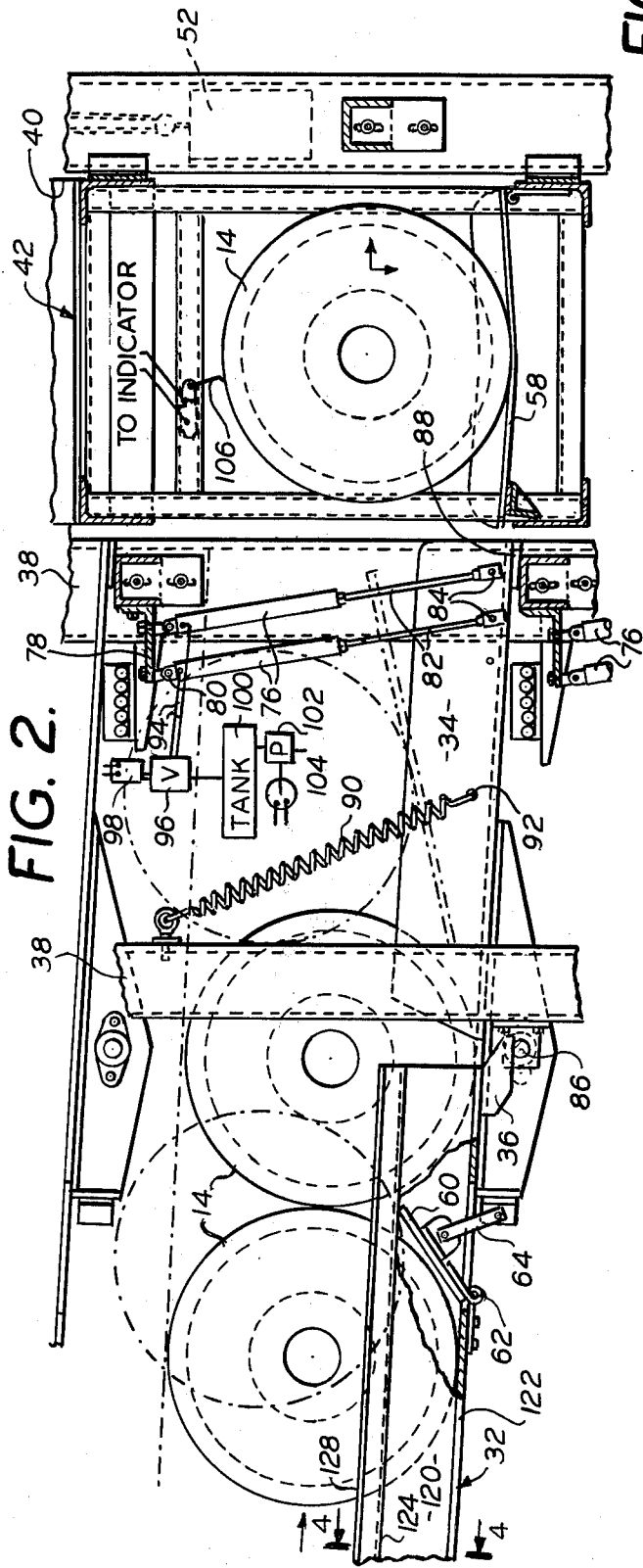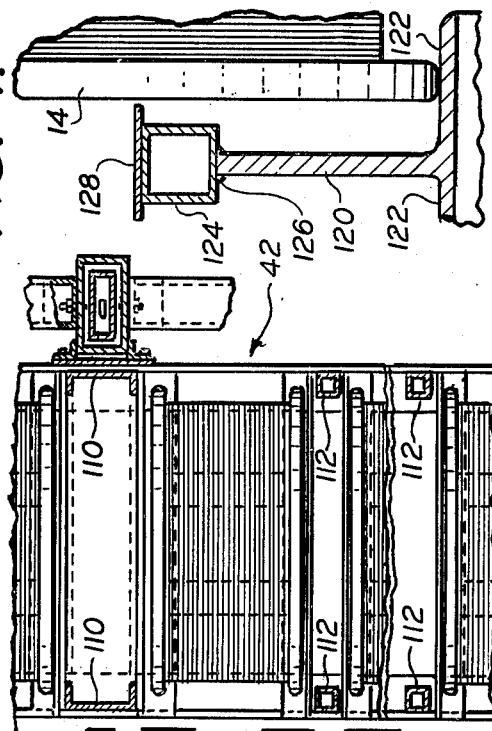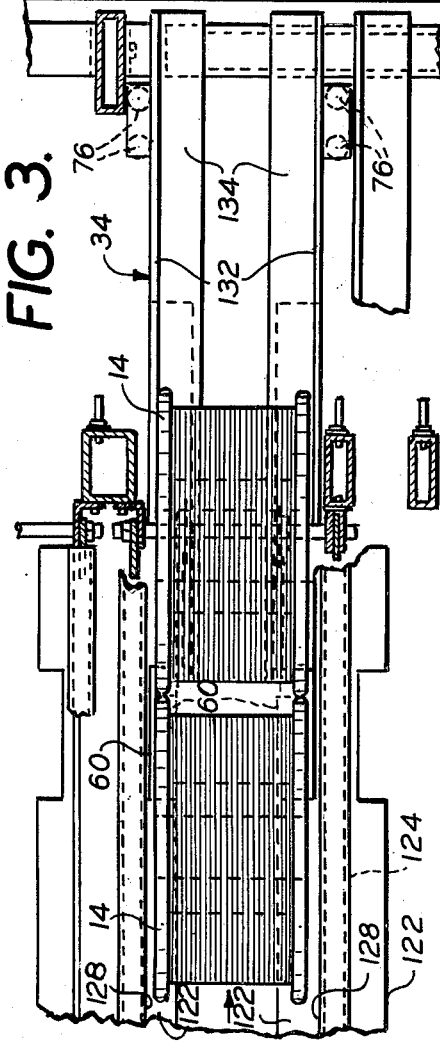

4,071,150

CONDUCTOR SUPPLY SYSTEM FOR COMMUNICATION CABLE MAKING APPARATUS

BACKGROUND AND SUMMARY OF THE INVENTION

This invention is part of a facility for making communication cables having numerous color coded pairs of conductors cabled together in a cabling machine. This invention is concerned with the loading of paired bobbins into compartments of a storage rack.

Bobbins of a particular color coding are stored in the same rack compartment; if there are 25 different color codes, then the rack has 25 different compartments, preferably located along the same horizontal level of the storage rack. By using a multi-layer storage rack, bobbins of the same color coding but with different size conductors can be stored one over another; then an elevator is used to receive bobbins from the particular layer which stores the color coded conductors of a particular size or gauge.

The elevator preferably extends for the full width of the storage rack so that when the elevator is located at the discharge end of the racks for a particular size of conductor, all of the bobbins called for by the cabling machine can be rolled on to the elevator at the same time.

The elevator descends to a lower level at which the elevator floor is moved into a sloping position so as to roll the bobbins, by gravity, from the elevator and on to a floor conveyor that carries the bobbins to the cabling machine.

Features of the invention relate to the control of discharge of bobbins from each compartment and to the prevention of the discharge of more bobbins than called for. Discharge chutes than span the space between the elevator and the discharge ends of the compartments are preferably used to control the number of bobbins that roll from a compartment to the elevator. Other features relate to the supply of the paired bobbins by conveyor to locations from which they are lifted by a crane to the particular storage rack compartments in accordance with the color coding of the bobbins.

Other objects, features and advantages of the invention will appear or be pointed out as the description proceeds.

BRIEF DESCRIPTION OF DRAWING

In the drawing, forming a part hereof, and which like reference characters indicate corresponding parts in all the views:

FIG. 1 is a diagrammatic, fragmentary side elevation of the paired bobbin supply means, loading crane, storage rack, elevator, and conveyor for transporting the bobbins to a cabling machine;

FIG. 2 is a greatly enlarged, fragmentary view, largely diagrammatic, showing the discharge end of one of the storage compartments of the rack of FIG. 1 and the construction of the elevator shown in FIG. 1;

FIG. 3 is a top plan view of the apparatus shown in FIG. 2;

FIG. 4 is a fragmentary, sectional view taken on the line 4—4 of FIG. 2 and showing guide means for the bobbins which roll by gravity toward the discharge end of a compartment of the rack;

FIG. 6 is a diagrammatic top plan view, on a greatly reduced scale, showing the operation of the structure shown in FIG. 5.

DESCRIPTION OF PREFERRED EMBODIMENT

Figure 5:
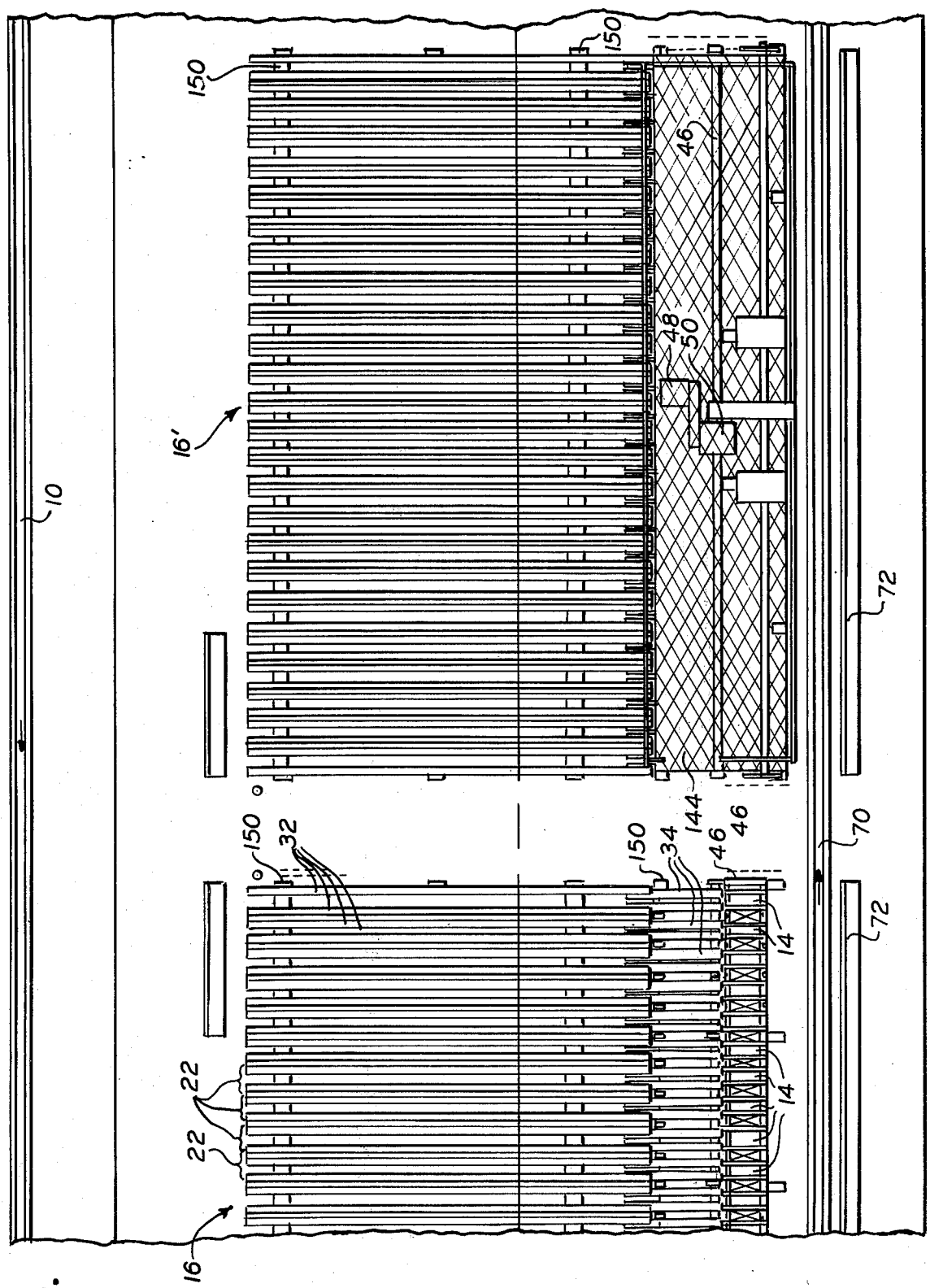
FIG. 5 is a top plan view, on a reduced scale, showing bobbin storage racks and conveyors of which the structure shown in FIG. 1 forms a part.

FIG. 1 shows a conveyor 10 located in a floor 12 of a manufacturing plant. The conveyor 10 moves in a direction perpendicular to the plane of the paper and bobbins 14 are carried by the conveyor 10′ each bobbin being balanced on a concave top surface of the conveyor 10.

A bobbin storage rack 16, which is shown as a multi-layer rack, extends horizontally and parallel to the course of the conveyor 10. Bobbins 14 are ejected from the conveyor 14 on to tracks 18 which slope downwardly toward the rack 16 so that the bobbins 14 roll by gravity toward the rack 16. The length of the track 18 is broken away in FIG. 1 so as to increase the scale of the drawing; but it should be understood that this track 18 is long enough to accumulate a number of bobbins 14. A stop 20 at the lower end of the track 18 prevents bobbins from rolling beyond the end of the track.

There are preferably four tracks 18 serving the complete system. Bobbins with the same color coding are stored in these compartments but each compartment contains bobbins having a different conductor or wire size.

Similar stacks of compartments are located side by side along the length of the rack 16, as will be explained in connection with FIG. 5. For the present it is sufficient to understand that there is a separate track 18 for each stack of bobbin compartments and that bobbins 14 are ejected from the conveyor 10 on to whichever track 18 corresponds with the stack of compartments for storing the particular color code of the respective bobbins that come along the conveyor 10.

Bobbins 14 resting against the stop 20 are lifted by a crane 26 having a hoisting arm 28. The crane 26 lifts the respective bobbins 14 and inserts them into the receiving end (left end in FIG. 1) of the particular compartment 22a–d in which the bobbin belongs.

FIG. 6 shows the crane 26 supported by tracks 30 which are overhead tracks above the rack 16, and a companion rack 16′. The crane 26 moves along the tracks 30 to bring it into alignment with the particular stack of compartments to which delivery is to be made; automatic controls for obtaining proper alignment can be used but form no part of the present invention.

FIG. 1 shows the compartment 22c with a number of bobbins 14 located in it; and part of the length of this compartment 22c and the other compartments of the rack 16 are broken away to increase the scale of the drawing. Each of the compartments 22a–d has a bobbin support 32 with a surface along which the bobbins 14 roll. This support 32 slopes downward toward the discharge end of the compartment (the right hand end in FIG. 1) and there is a movable stop or chute 34 hinged to lugs 36 extending downward from opposite sides of the support 32.

When the chute 34 is in raised position, as shown in the compartment 22c in FIG. 1, the chute 34 serves as a stop for preventing the end most bobbin 14 from running out of the compartment 22c. The upward slope of the chute 34 holds the bobbin 14 at rest in the position shown in FIG. 1.

At the discharge end of the compartments 22a-d, there is a rigid structure 38 which includes an elevator shaft 40. An elevator 42 is moved up and down in the shaft 40 by a hoisting cable or chain 44 which passes over a drum or sprocket 46 operated by a motor 48 through appropriate motion transmitting means 50.

In the construction illustrated, a counter weight 52 moves up and down in a hollow column 54. The specific control means for raising and lowering the elevator 42 and for stopping the elevator at different levels of the rack 16 forms no part of the present invention. The control means are preferably remote controlled and provided with leveling devices for bringing the elevator to the proper level with the selected compartment. Such controls are well known in the elevator art and no description of them is necessary for a complete understanding of the present invention.

FIG. 1 shows the elevator 42 in alignment with the support 32 of compartment 22b. The chute 34 of compartment 22b is in its lowered position spanning the space between the discharge end of the support 32 and a floor 58 of the elevator 42. This floor 58 slopes to a low middle portion so that bobbins 14 which roll by gravity from the support 32 across the chute 34 settle in a center position in the elevator 42.

Since the elevator 42 can accommodate only one bobbin from each of the horizontally associated compartments, means are provided to prevent a second bobbin from rolling down the chute 34 into the elevator 42. This is accomplished by having a stop 60 move upward into contact with the next bobbin 14 when the chute 34 is lowered to span the space between the rack 16 and the elevator 14. This stop 60 is shown as a part of the support 32 along which the bobbins 14 roll. The stop 60 is connected with an adjacent part of the support 32 by a hinge 62. A link 64 connects the stop 60 with the end of the chute 34 beyond its pivot connection to the lugs 36 so that as the chute 34 swings clockwise, the link 64 is moved upward and raises the stop 60. Conversely, movement of the chute 34 upward into position to stop a rolling bobbin lowers the stop 60 so that the bobbin in contact with the stop 60 rolls by gravity into contact with the chute 34 preparatory to an operation for loading it on to the elevator on the next trip of the elevator to bring a bobbin from the compartment 22b.

When the elevator 42 moves to the lower end of the shaftway 40, as indicated in broken lines in FIG. 1, the floor 58 of the elevator contacts with an upstanding abutment 68 which tilts the elevator floor 58 in a direction to cause the bobbins 14, on the elevator, to roll off the elevator and on to a floor conveyor 70 which has articulated sections, like the conveyor 10, with low middle portions for balancing the bobbins 14 in a center position on the conveyor 70. A fence 72 extends along the conveyor 70 parallel to the conveyor and to the elevator 42 so that bobbins 14 which roll out of the elevator by gravity cannot roll beyond the conveyor 70. The fence 72 stops the bobbin 14 before the bobbin 14 has run off the sloping surface which centers the bobbin on the conveyor 70.

This conveyor 70 receives all of the bobbins on the elevator 42 and carries them away from the racks 16 and 16′ (FIG. 6) to another run of the conveyor 70, as indicated by the arrow 74 and this run of the conveyor 70 transports the paired bobbins 14 to the cabling machine.

To make the drawing compact in FIG. 6, the different runs of the conveyor 70 are shown close together; but it will be understood that the travel of the conveyor links away from the racks 16 and 16′ can be as long as necessary to reach the region of the plant where the paired bobbins are to be used on the pay-offs of cabling machines.

FIGS. 2-4 show the construction of the elevator 42 and the delivery end of the compartments on a larger scale than in FIG. 1. The chute 34 is raised and lowered by motor means comprising cylinder-and-piston motors 76. These motors 76 are connected to a bracket 78 on the rigid structure 38 by pivot connections 80. The piston rods 82 of the motors 76 are connected with the chute 34 by pivot connections 84.

In the construction illustrated in FIG. 2, the motors 76 push the chute 34 downward about a pivot connection 86 between the chute and the lugs 36. Downward movement of the free end of the chute 34 is limited by contact with a stop 88. A coil tension spring 90 is connected at its opposite ends to a part of the rigid structure 38, and at its lower end to the chute 34 by a connection 92. When working fluid pressure in the motors 76 is released, the spring 90 pulls the chute 34 upward (counterclockwise) until the stop 60 moves into alignment with the bobbin supporting surface of the support 32 and this limits further upward movement of the chute to the position where it acts as a stop for the bobbin 14 as shown in compartment 22c of FIG. 1.

Double acting motors can be used for the motors 76 but the spring 90 for holding the chute 34 in raised position has the advantage that in the event of failure of the working fluid pressure in the motors 76, there is no danger that the chute 34 will drop by its own weight into its lowered position and thus permit the endmost bobbin 42 to roll off the chute 34.

FIG. 2 shows the motors 76 supplied with working fluid through tubing 94 from a control valve 96 operated by a solenoid 98.

Working fluid is supplied to the value 96 from a pressure tank 100 into which working fluid is pumped by a pump 102 driven by an electric motor 104. This power supply is purely diagrammatic and any other power supply can be used which has means responsive to a remote signal such as the solenoid 98 which is energized from a remote control whenever the chute 34 is to be operated to load another bobbin on the elevator 42.

Other motors 76 for the chute of the next compartment below that shown in FIG. 2 is shown connected with the structure 38 just below the chute 34 in FIG. 2. It will be understood that the delivery end of all of the compartments can be constructed in the same way as shown in FIG. 2.

In the event that there are no bobbins in a particular compartment it is necessary to provide a signal to the remote control station indicating that the signal to the solenoid 98 to load a bobbin on the elevator 42 has not been carried out. This information is supplied by having a feeler 106 located in the elevator 42 above the space occupied by the flange of a bobbin 42 in each portion of the elevator that holds bobbins 14. If a bobbin flange contacts with the feeler 106 a signal is supplied to the remote control station indicator to confirm the successful loading of a bobbin on the elevator. If no indication is received from the feeler 106 within a short time after the solenoid 98 has lowered the chute 34, then it is evident that the bobbin supply for the particular chute has been exhausted and provision must be made for obtaining additional bobbins with the color coding and conductor size for the empty compartment.

FIG. 3 shows the elevator 42 with wide vertical structural elements 110 at some locations along the width of the elevator and with narrower vertical structural elements 112 at other locations along the width of the elevator. The width of the bobbin receiving spaces of the elevator must be located to accommodate the difference in the width of these elevator sections 110 and 112. The compartments of the rack must also coincide with the spacing of the structural members of the elevator so that all of the compartments of the rack align with a bobbin receiving space of the elevator.

Referring to FIGS. 2, 3 and 4, the supports 32, which form the lower parts of the compartments of the rack, have structural sections 120 extending lengthwise of the compartments and dividing one compartment from another. At the lower ends of these structural sections 120 there are horizontal flanges 122 which form the tracks on which the bobbins roll as they travel from the entrance to the discharge end of a compartment of the rack.

FIG. 4 shows a square tube 124 attached to the upper end of the structural section 120 by welding 126. On top of this square tube 124, there is a strip 128, preferably made of metal and rigidly secured to the square tube 124.

Flanges of the bobbins 14 roll along the flanges 122 of the structural section 120 and the bobbins are held centered in the compartments by the edges of the strip 128 contacting with the sides of the bobbin flange. Because of the small area of contact between the strip 128 and the bobbin flange, there is very little friction involved in steering the bobbin and this low friction makes it possible to use low angle of inclinations in obtaining movement by gravity of the bobbins in the compartments.

The flanges 122 do not extend across the full width of a compartment of the rack. FIG. 3 shows flanges 122 on opposite sides of the compartment in which the bobbins 14 of FIG. 3 are located. There is a wide open space between the confronting edges of the flanges 122 since the flanges of the bobbins never move far enough away from the strips 128 to require any wider surface for the bobbins to contact on the flanges 122. Clearance between the bobbin flanges and the strips 128 are exaggerated in FIG. 3 for clearer illustration.

The chute 34 is of a construction similar to that of the supports 32 except that there are no adjacent compartments alongside the chute 34 so that it is sufficient to have right angle sections 132 comparable to the structural sections 120 of the rack compartments. A flange 134 on the inwardly facing side of the structural sections 132 is sufficient since no bobbin supports on the other side are necessary.

FIG. 5 is a top plan view similar to FIG. 6 but on a larger scale and showing somewhat more detail for correlating the parts shown in plan view with those shown in detail in FIGS. 1–3.

A protecting cage 144 is shown over the elevator 46 and the elevator operating mechanism in FIG. 5 for the apparatus that handles bobbins removed from the rack 16'.

The cage 144 for the rack 16 is omitted in FIG. 5 so as to illustrate more clearly the elevator 46 and its load of bobbins 14. The elevator is shown with a full load of bobbins but it will be understood from the previous description that the actual number of bobbins supplied to the elevator depends upon the number required for the particular cabling operation to which the bobbins are being supplied. Chutes 34 are shown in FIG. 5 with no bobbins on the chutes. The supports 32 are also shown with no bobbins in the compartments. This illustrates the construction of the rack more clearly and the way in which bobbins are stored in the compartments and roll be gravity to the elevator has been explained in connection with the larger scale Figures.

The supports 32 for the different compartments 22 rest on fixed supports 150, which are part of the structure of the rack 16.

The preferred embodiment of the invention has been illustrated and described, but changes and modifications can be made and some features can be used in different combinations without departing from the invention as defined in the claims.

What is claimed is:

1. A bobbin supply rack and selective dispensing system for a communication cable manufacturing facility in which wire is wound on bobbins having flanges on both sides thereof and on which the bobbins roll from one location to another, including in combination a rack having a plurality of compartments in vertical alignment with one another and similar horizontally-spaced compartments in horizontal alignment with one another, a supply of bobbins, each having a drum portion and flanges at opposite ends of the drum portion, groups of the bobbins having wire wrapped thereon with insulation of different color coding on the wire than on other groups of the bobbins, each of the compartments being of a length to receive and accumulate a plurality of bobbins wrapped with insulation of the same color coding, each compartment having a discharge end, an elevator shaftway at the end of the rack at which each of the discharge ends of the compartments are located, an elevator in the shaftway and extending across the discharge ends of a plurality of the horizontally spaced compartments of the rack, guides along which flanges of the bobbins of a particular color coded insulation roll into a preselected space on the elevator, and means for selectively discharging the bobbins onto the elevator from the selected horizontally spaced compartments in accordance with the color coded wires necessary for delivery to a cable making facility, said means for selectively discharging the bobbins including separate motor means at each compartment, and a stop operated by each of the separate motor means into a position to prevent discharge of a bobbin from the compartment of that motor means and into a position that permits the bobbin to roll from the compartment onto the elevator.

2. The bobbin supply rack and selective dispensing system described in claim 1 characterized by each of the horizontally-spaced compartments having a bobbin supporting surface sloping downward toward the discharge end of the compartment with a slope that causes bobbins to roll by gravity from the compartment and on to the elevator, the stop for each compartment being movable into position for preventing a bobbin on each of said bobbin support surfaces from rolling off the discharge end of the supporting surface, and remote control means for selectively operating the motor means of the different horizontally-spaced compartments depending upon which bobbins are needed to make a particular combination of color coded pairs required for a given cabling operation.

3. The bobbin supply rack and selective dispensing system described in claim 1 characterized by each horizontally spaced compartment being of a size to store a row of the bobbins wound with a different coding pair than the bobbins in other horizontally spaced compartments, each of the compartments having its own bobbin-supporting surface sloping downward toward the discharge end of the compartment with a slope that causes bobbins to roll by gravity from the compartment and on to the elevator, the motor-operated stop in the rack being at the discharge end of each compartment for preventing a bobbin from rolling out of the compartment at the discharge end thereof, and a second stop in each horizontally-spaced compartment in the rack and in position to prevent the next bobbin in the compartment from rolling to the discharge end of the compartment, and controls for moving said stops into inoperative positions to discharge the end bobbin from the compartment and for causing the next bobbin to move to the end of the compartment.

4. The bobbin supply rack and selective dispensing system described in claim 3 characterized by the movable stop at the discharge end of each horizontally-spaced compartment being a chute extending beyond the downwardly sloping bobbin flange supporting surface of the compartment, hinged connections joining the chutes to the end of each compartment, each chute having a surface over which flanges of the bobbins roll in passing across a space between the rack and the elevator, said chute when swung upward about its hinge connection providing a steep grade that holds the end bobbin against movement toward the elevator, and the second stop being an abutment connected with a floor of the compartment, and connecting control means that moves the second stop into active position when the chute moves into position to discharge a bobbin onto the elevator.

5. The bobbin supply rack and selective dispensing system described in claim 1 characterized by each of the compartments having a bobbin flange-supporting surface sloping downward toward the discharge end of the compartment with a slope that causes bobbins to roll by gravity from the compartment and on to the elevator, an elevator shaft at a fixed location beyond and spaced from the discharge ends of the rack compartments, the elevator in the shaft being also spaced from the discharge ends of the compartments, and a movable stop at the discharge end of each compartment including a chute extending beyond the downwardly sloping bobbin-flange supporting surface of the compartment, the chutes being movable into extending positions reaching from the compartments to the elevator.

6. The bobbin supply rack and selective dispensing system described in claim 1 characterized by the motor means for moving the chutes, into position to stop rolling of the bobbins, being operated, at least indirectly, by electric power, and other means for moving the chutes into a raised, non-discharge, position in event of failure of the electric power supply.

7. The bobbin supply rack and selective dispensing system described in claim 1 characterized by the motor means being cylinder and piston motors operated by fluid and pressure to move the chutes downward into position for bobbin flanges to run from the compartment across the chute to the elevator, and for moving the chutes into an upwardly extending position to stop bobbins from rolling off the discharge end of the compartments, and the other means for moving the chutes upward in the event of failure of the supply of power being springs.

8. The bobbin supply rack and selective dispensing system described in claim 1 characterized by a conveyor at a different level from the bobbin storage compartments, the elevator being movable from the level of the bobbin storage compartments to the different level of the conveyor and at which the bobbins on the elevator can roll off the elevator and on to the conveyor for transport to a cabling machine.

9. The bobbin supply rack and selective dispensing system described in claim 8 characterized by the elevator being of a length along which the bobbins are located side by side during movement of the elevator to the conveyor level, and the conveyor extending parallel to the elevator and being oriented so that bobbins are substantially equally spaced from the conveyor when the elevator is at the level for transferring bobbins to the conveyor.

10. The bobbin supply rack and selective dispensing system described in claim 8 characterized by means for tipping the floor of the elevator to a slope that rolls the bobbins off said elevator and onto the conveyor.

11. The bobbin supply rack and selective dispensing system described in claim 8 characterized by the elevator having a floor which is lowest along a region extending generally at right angles to the direction in which bobbins roll on to the elevator whereby the bobbins are held centered by gravity on the elevator floor and an abutment at the lower part of the elevator shaft in position to change the slope of the elevator floor by raising the level of the floor on the side of the elevator from which the bobbins entered the elevator and to an angle that causes the bobbins to roll off the elevator and on to the conveyor.

12. The bobbin supply rack and selective dispensing system described in claim 9 characterized by a plurality of racks, each of which has compartments for bobbins, different elevators for the different racks, each elevator being of substantially the same length as the rack with which it is used.

13. The bobbin supply rack and selective dispensing system described in claim 1 characterized by the rack being a multi-level rack with a layer of compartments at each level, bobbins with a particular size of wire being at the same level, and bobbins with other sizes of wire thereon at other levels, and bobbins of different color coding for each wire size being in horizontally spaced compartments at the same level, the elevator being movable into register with any level of the rack and extending for the full length of the rack whereby all of the color coded pairs required for a particular cable of a particular size of wire can be discharged from selected compartments on to the elevator for transport to the cabling machine with a single stop of the elevator.

14. The bobbin supply rack and selective dispensing system described in claim 13 characterized by the elevator having compartments which register with the compartments of any selected level of the rack, and a bobbin detector in each compartment for registering to a remote indicator the presence of the bobbin in each particular compartment of the elevator.

15. The bobbin supply rack and selective dispensing system described in claim 1 characterized by each of the rack compartments being open at the end remote from the discharge end whereby new bobbins can be loaded into the compartments of the rack at the same time that bobbins in the compartments are being withdrawn to the elevator.

16. The bobbin supply rack and selective dispensing system described in claim 1 characterized by a loading crane located on the side of the rack opposite to the elevator, the loading crane being movable along a course generally parallel to the side of the rack and operable to load bobbins with color coded pairs into the ends of their respective compartments remote from the end at which the bobbins are discharged on to the elevator.

17. The bobbin supply rack and selective dispensing system described in claim 16 including a conveyor that brings bobbins with color coded pairs to a location adjacent to the area along which the crane moves, a portion of the conveyor running parallel to the range of movement of the crane for the length of the rack whereby the crane can lift bobbins from the conveyor and load them into compartments of the rack having the same color coding as the respective bobbins received from the pairing department.

* * * * *